United States Patent
Chang et al.

(10) Patent No.: US 8,437,981 B2
(45) Date of Patent: May 7, 2013

(54) SYSTEM AND METHOD FOR VERIFYING MANUFACTURING ACCURACY

(75) Inventors: Chih-Kuang Chang, Taipei Hsien (TW); Zhong-Kui Yuan, Shenzhen (CN); Dong-Hai Li, Shenzhen (CN); Li Jiang, Shenzhen (CN); Yong-Hong Ding, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 455 days.

(21) Appl. No.: 12/824,245

(22) Filed: Jun. 28, 2010

(65) Prior Publication Data

US 2011/0191049 A1    Aug. 4, 2011

(51) Int. Cl.
  *G01B 5/20*    (2006.01)
  *G06F 11/00*    (2006.01)

(52) U.S. Cl.
  USPC ............ 702/167; 702/182; 702/183; 702/188

(58) Field of Classification Search .......... 702/121–123, 702/167, 179–189
  See application file for complete search history.

(56) References Cited

U.S. PATENT DOCUMENTS

| 6,532,820 | B1 * | 3/2003 | Fleming et al. ................ 73/627 |
| 2004/0094728 | A1 * | 5/2004 | Herzog et al. ........... 250/559.06 |

* cited by examiner

*Primary Examiner* — Phuong Huynh
(74) *Attorney, Agent, or Firm* — Altis Law Group, Inc.

(57) ABSTRACT

In a method for verifying manufacturing accuracy, a point cloud of a workpiece is read. A first determined point is determined according to the first point of the point cloud and a second determined point is determined according to the final point of the point cloud. A first line, a second line, and a third line are all located by respectively connecting the first point and the first determined point, the final point and the second determined point, and the first determined point and the second determined point. Qualification of the workpiece is determined by measuring a first angle of the first line and the third line, a second angle of the second line and the third line, a first distance between the first determined point and the second line, and a second distance between the second determined point and the first line.

11 Claims, 6 Drawing Sheets

SYSTEM AND METHOD FOR VERIFYING MANUFACTURING ACCURACY

BACKGROUND

1. Technical Field

Embodiments of the present disclosure generally relate to manufacturing, and more particularly, to a system and method for verifying manufacturing accuracy.

2. Description of Related Art

Most workpieces have corner angles. An example of a corner angle of a workpiece is shown in FIG. 1. In order to improve quality of manufactured workpieces, each corner angle of the workpieces must accord with a quality standard. For example, the degree of a corner angle must between a predetermined degree range. Thus, the corner angles of the workpieces need to be measured before shipment.

However, originally, corner angles of workpieces are manually measured using conventional tools. Efficiency of the measurement is thus low and the cost high.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
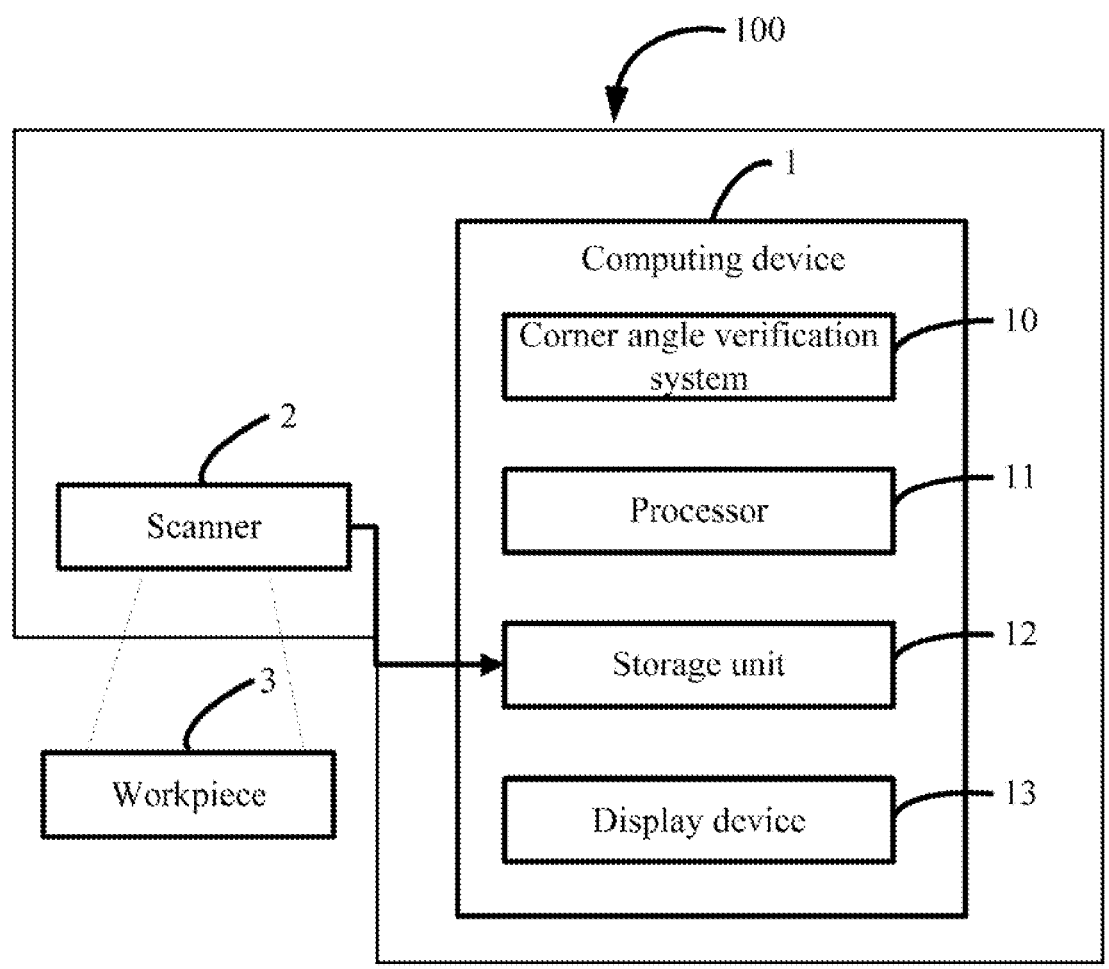
FIG. 2 is a block diagram of one embodiment of a system for verifying manufacturing accuracy.

FIG. 2 is a block diagram of one embodiment of a system 100 for verifying manufacturing accuracy of a workpiece 3. The workpiece 3 has at least one corner angle. The system 100 measures whether the degree of the at least one corner angle is between a predetermined degree range. In one embodiment, the system 100 includes a computing device 1 and a scanner 2. The computing device 1 communicates with the scanner 2 by a wired or wireless connection. The computing device 1 may be a computer, a server, for example, and the scanner 2 may be a laser scanner.

The computing device 1 includes a corner angle verification system 10, a processor 11, a storage unit 12, and a display device 13. The corner angle verification system 10 includes a plurality of functional modules (described with reference to FIG. 3), to verify the corner angle of the workpiece 3, thereby determining whether the workpiece 3 is qualified. The processor 11 can execute one or more computerized codes of the functional modules of the corner angle verification system 10. The storage unit 12 stores a point cloud of the workpiece 3. It may be understood that the point cloud is a set of vertices in a three-dimensional coordinate system. These vertices are usually defined by X, Y, and Z coordinates. The point cloud is created by the scanner 2. The scanner 2 measures a large number of points on the surface of the workpiece 3, and outputs the point cloud as a data file to the storage unit 12. The storage unit 12 further stores the one or more computerized codes of the functional modules of the corner angle verification system 10. The display device 13 provides a user interface (UI) displaying whether the workpiece 3 is qualified.

Figure 3:
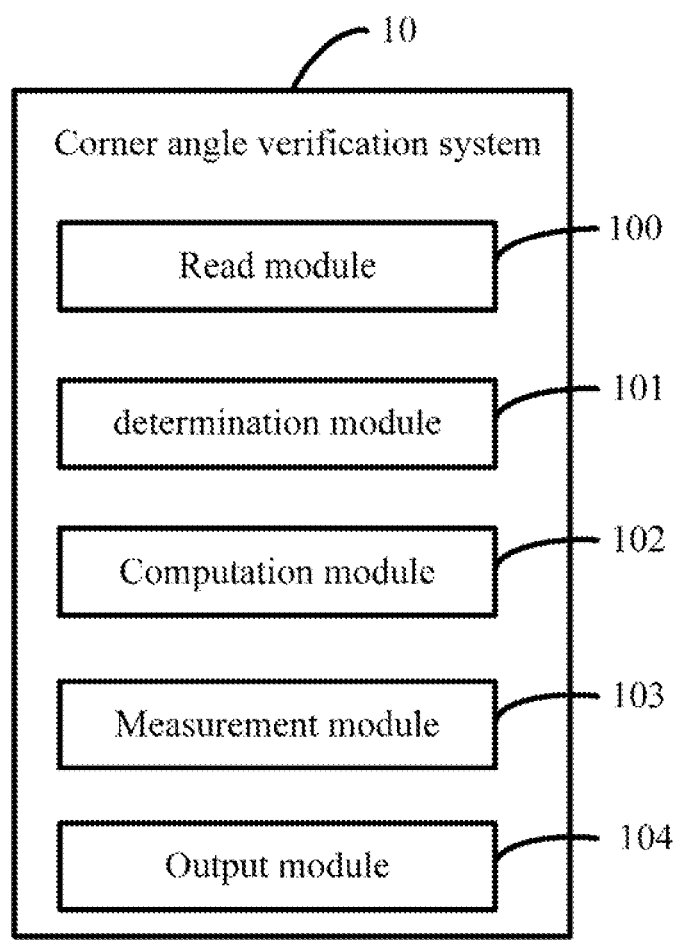
FIG. 3 is a block diagram of functional modules of a corner angle verification system in FIG. 2.

FIG. 3 is a block diagram of the functional modules of the corner angle verification system 10 in FIG. 2. In one embodiment, the corner angle verification system 10 includes a read module 100, a determination module 101, a computation module 102, a measurement module 103, and an output module 104.

The read module 100 reads the point cloud of the workpiece 3 from the storage unit 12, and arranges the point cloud in order, to generate a point sequence. In some embodiments, the arrangement of the point cloud may be based on the scan taken by the scanner 2.

The determination module 101 selects the first point and the final point from the point sequence, determines a first determined point according to the first point, and determines a second determined point according to the final point. Thus, a first line can be located by connecting the first point and the first determined point, the second line can be located by connecting the final point and the second determined point, and the third line can be located by connecting the first determined point and the second determined point.

In one embodiment, determination of the first determined point is as follows. The determination module 101 selects a subsequent point following a current selected point, such as the first point, from the point sequence, and computes a vector formed by the selected point and the subsequent point. If the vector is less than a predetermined value, the determination module 101 continues to select another subsequent point following a current selected point from the point sequence, and further computes a vector formed by the selected point and the subsequent point. If the vector exceeds the predetermined value, the determination module 101 records the subsequent point as a recorded point. The determination module 101 selects at least one first adjacent point of the first point and at least one second adjacent point of the recorded point from the point sequence, and fits a line using the at least one first adjacent point and the at least one second adjacent point to generate a fitted line. The determination module 101 computes a distance between each of the at least one first adjacent points and the fitted line, and a distance between each of the at least one second adjacent points and the fitted line, to determine the point farthest from the fitted line according to the computed distances. The determined point is the first determined point.

In one embodiment, determination of the second determined point is as follows. The determination module 101 selects a previous point from a current selected point, such as the final point, from the point sequence, and computes a vector formed by the selected point and the previous point. If the vector is less than a predetermined value, the determination module 101 continues to select a previous point from a current selected point, that is, the previous point of the final point, the last second point, for example from the point sequence, and further computes a vector formed by the selected point and the previous point. If the vector exceeds the predetermined value, the determination module 101 records the previous point as a recorded point. The determination module 101 selects at least one first adjacent point of the final point and selects at least one second adjacent point of the recorded point from the point sequence, and fits a line using the at least one first adjacent point and the at least one second adjacent point to generate a fitted line. The determination module 101 computes a distance between each of the at least one first adjacent points and the fitted line, and a distance between each of the at least one second adjacent points and the fitted line, to determine the point farthest from the fitted line according to the computed distances. The determined point is the second determined point.

Figure 6:
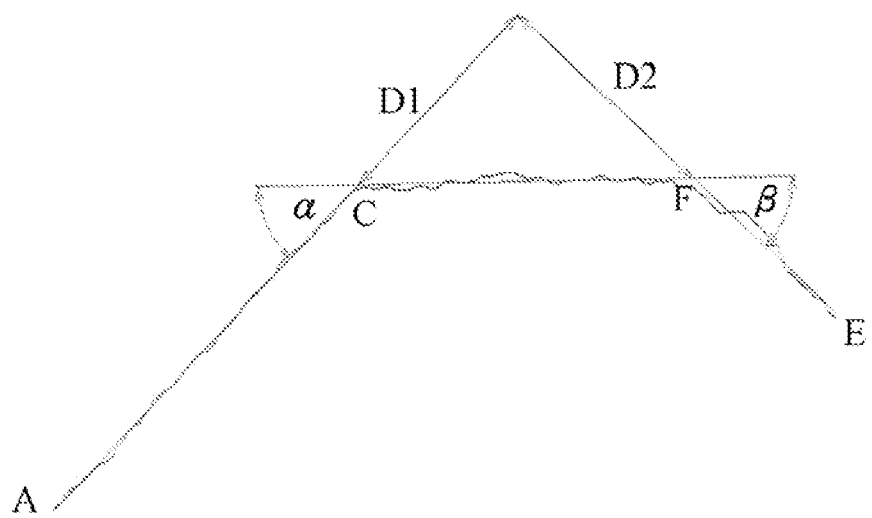
FIG. 6 illustrates an example of angles and distances computed in block S19 and block S21 in FIG. 4.

The computation module 102 computes a first angle formed by the first line and the third line, and computes a second angle formed by the second line and the third line. The computation module 102 further computes a first distance between the first determined point and the second line, and computes a second distance between the second determined point and the first line. In an example shown in FIG. 6, point A is the first point, point E is the final point, point C is the first determined point, and point F is the second determined point, thus, angle $\alpha$ is the first angle formed by the first line AC and the third line CF, angle $\beta$ is the second angle formed by the second line EF and the third line CF, distance D1 is the first distance between the first determined point C and the second line EF, and distance D2 is the second distance between the second determined point F and the first line AC.

The measurement module 103 determines whether the workpiece 3 is qualified according to the first angle, the second angle, the first distance, and the second distance. In one embodiment, if both the first angle and the second angle are within a first predetermined range and both the first distance and the second distance are within a second predetermined range, the measurement module 103 determines that the workpiece 3 is qualified. Otherwise, if at least one of the first angle and the second angle is not within the first predetermined range, or at least one of the first distance and the second distance is not within the second predetermined range, the measurement module 103 determines that the workpiece 3 is not qualified.

The output module 104 outputs a measurement result of whether the workpiece 3 is qualified, and displays the measurement result on the display device 13.

Figure 1:
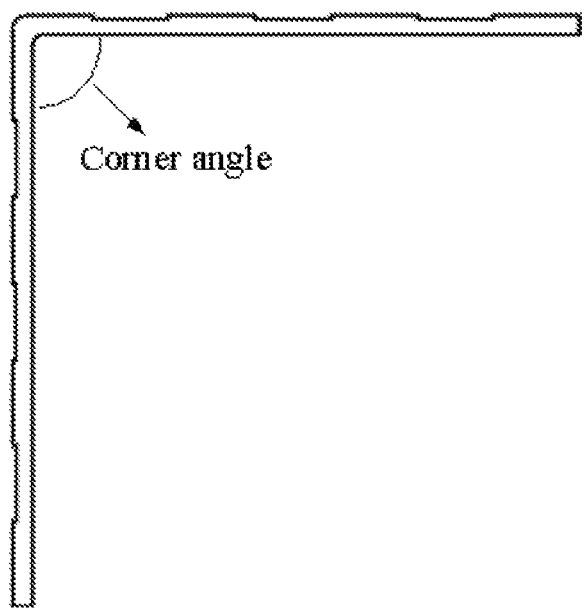
FIG. 1 illustrates an example of a corner angle.
Figure 4:
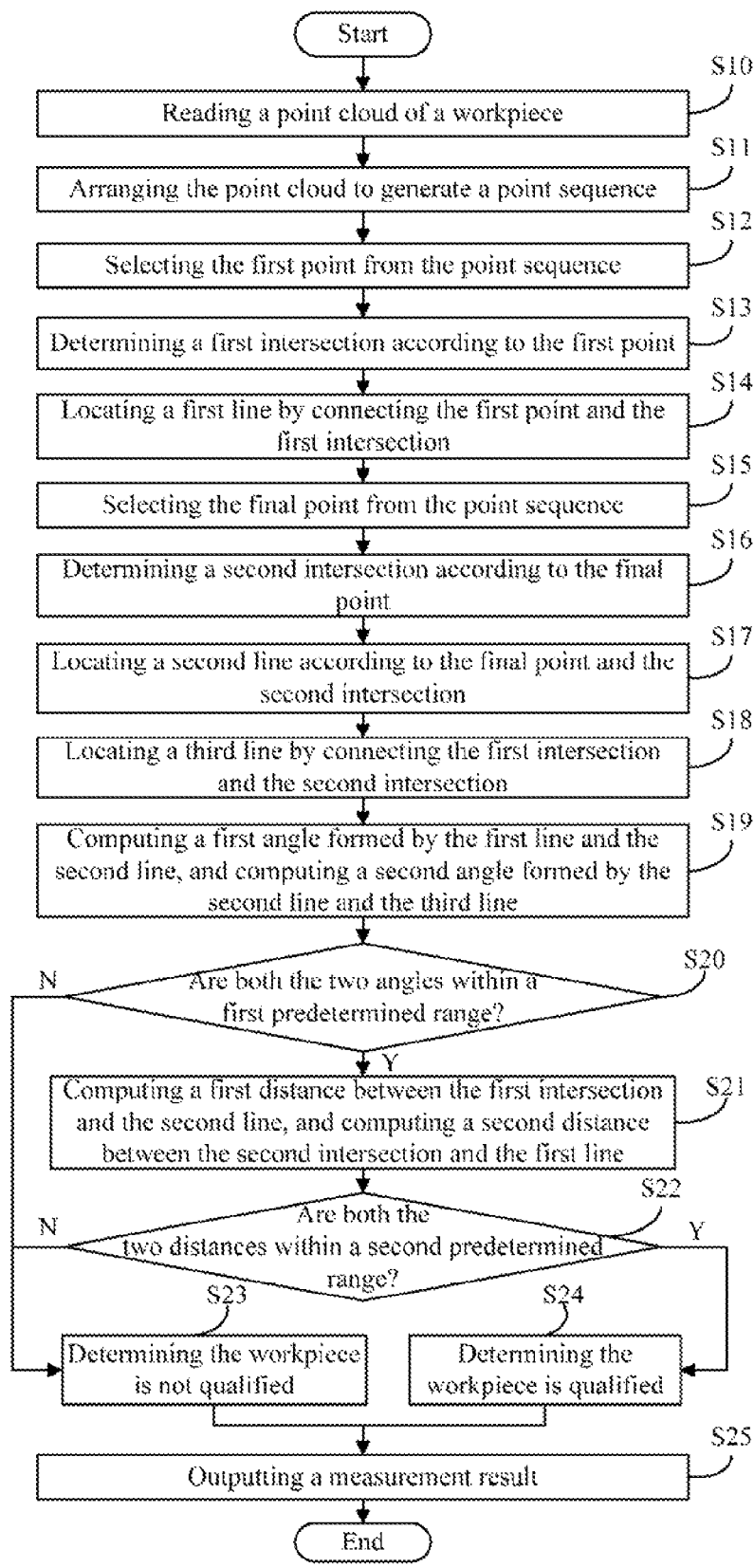
FIG. 4 is a flowchart of one embodiment of a method for verifying manufacturing accuracy.

FIG. 4 is a flowchart of one embodiment of a method for verifying manufacturing accuracy using the system 100 of FIG. 1. The method can be performed by execution of a computer-readable program code by at least one processor 11 of computing device 1. Depending on the embodiment, additional blocks in the flow of FIG. 4 may be added, others removed, and the ordering of the blocks may be changed.

In block S10, the read module 100 reads a point cloud of the workpiece 3 from the storage unit 12.

In block S11, the read module 100 arranges the point cloud to generate a point sequence. In one embodiment, the arrangement of the point cloud may be based on the scan taken by the scanner 2.

In block S12, the determination module 101 selects the first point from the point sequence.

In block S13, the determination module 101 determines a first determined point according to the first point. A detailed description of block S13 is given in FIG. 5.

In block S14, the determination module 101 locates a first line by connecting the first point and the first determined point.

In block S15, the determination module 101 selects the final point from the point sequence.

In block S16, the determination module 101 determines a second determined point according to the final point. A process of block S16 is similar with the process of above block S13, and is given below.

In block S17, the determination module 101 locates the second line by connecting the final point and the second determined point.

In block S18, the determination module 101 locates the third line by connecting the first determined point and the second determined point.

In block S19, the computation module 102 computes a first angle formed by the first line and the third line, and computes a second angle formed by the second line and the third line.

In block S20, the measurement module 103 determines whether both the first angle and the second angles are within a first predetermined range. Block S21 is implemented, if both the first angle and the second angle are within the first predetermined range. Otherwise, block S23 is implemented, if at least one of the first angle and the second angle is not within the first predetermined range.

In block S21, the computation module 102 computes a first distance between the first determined point and the second line, and computes a second distance between the second determined point and the first line.

In block S22, the measurement module 103 determines whether both the first distance and the second distance are within a second predetermined range. Block S24 is implemented if both the first distance and the second distance are within the second predetermined range. Otherwise, block S23 is implemented if at least one of the first distance and the second distance is not within the second predetermined range.

In block S23, the measurement module 103 determines that the workpiece 3 is not qualified. In block S24, the measurement module 103 determines that the workpiece 3 is qualified.

In block S25, the output module 104 outputs a measurement result of whether the workpiece 3 is qualified, and displays the measurement result on the display device 13.

Figure 5:
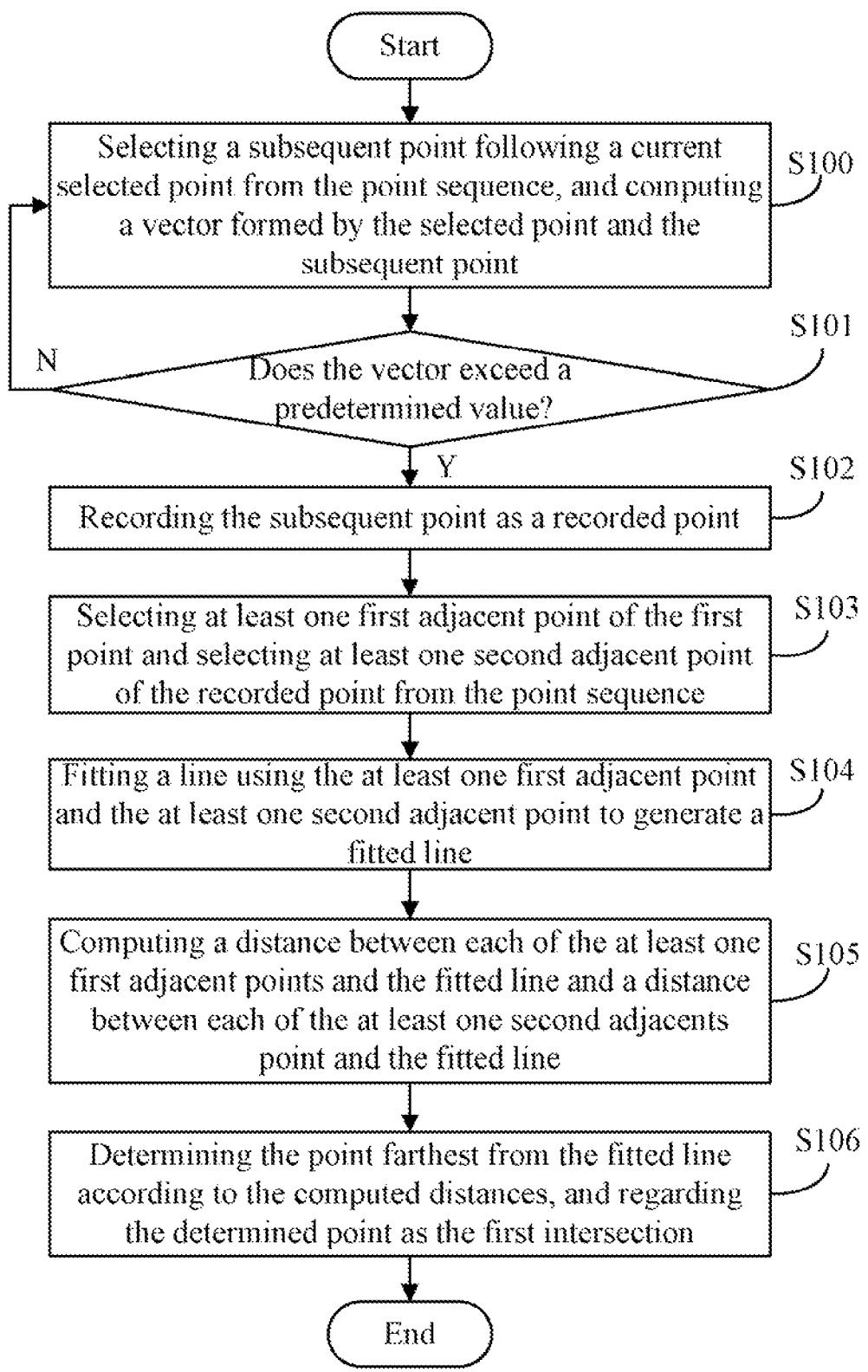
FIG. 5 is a flowchart detailing block S13 in FIG. 4.

FIG. 5 is a flowchart of detailed descriptions of block S13 in FIG. 4. Depending on the embodiment, additional blocks in the flow of FIG. 5 may be added, others removed, and the ordering of the blocks may be changed.

In block S100, the determination module 101 selects a subsequent point following a current selected point, such as the first point) from the point sequence, and computes a vector formed by the selected point and the subsequent point.

In block S101, the determination module 101 determines if the vector greater than a predetermined value. Block S100 is repeated to continue to select a subsequent point following a current selected point (the subsequent point of the first point, namely the second point, for example) from the point sequence, and further computes a vector formed by the selected point and the subsequent point, if the vector is less than the predetermined value. Otherwise, block S102 is implemented if the vector exceeds the predetermined value.

In block S102, the determination module 101 records the subsequent point as a recorded point in the storage unit 12.

In block S103, the determination module 101 selects at least one first adjacent point of the first point and at least one second adjacent point of the recorded point from the point sequence.

In block S104, the determination module 101 fits a line using the at least one first adjacent point and the at least one second adjacent point to generate a fitted line.

In block S105, the determination module 101 computes a distance between each of the at least one first adjacent point and the fitted line, and a distance between each of the at least one second adjacent point and the fitted line.

In block S106, the determination module 101 determines the point farthest from the fitted line according to the computed distances, and regards the determined point as the first determined point.

As mentioned above, the process of block S16 in FIG. 4 is similar with the process of block S13 as described above, but replacing the first point with the final point, and replacing the subsequent point following a current selected point with a previous point following a current selected point.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for verifying manufacturing accuracy of a workpiece, the method comprising:

reading a point cloud of the workpiece that is created by a scanner and stored in a storage unit, and arranging the point cloud to generate a point sequence;

selecting the first point from the point sequence, determining a first determined point by:

selecting a subsequent point following a current selected point one by one from the point sequence, until a vector formed by the current selected point and the subsequent point exceeds a first predetermined value;

recording the subsequent point as a first recorded point upon condition that the vector exceeds the first predetermined value;

selecting at least one adjacent point of the first point and selecting at least one adjacent point of the first recorded point from the point sequence;

fitting a line using the at least one adjacent point of the first point and the at least one adjacent point of the first recorded point to generate a first fitted line;

computing a distance between each of the at least one adjacent point of the first point and the first fitted line and a distance between each of the at least one adjacent point of the first recorded point and the first fitted line; and determining the point which is farthest from the first fitted line, from the at least one adjacent point of the first point and the at least one adjacent point of the first recorded point, according to the computed distances, wherein the determined point is the first determined point;

locating a first line by connecting the first point and the first determined point;

selecting the final point from the point sequence, determining a second determined point by:

selecting a previous point of a current selected point one by one from the point sequence until a vector formed by the current selected point and the previous point exceeds a second predetermined value;

recording the previous point as a second recorded point upon condition that the vector exceeds the second predetermined value;

selecting at least one adjacent point of the final point, and selecting at least one adjacent point of the second recorded point from the point sequence;

fitting a line using the at least one adjacent point of the final point and the at least one adjacent point of the second recorded point to generate a second fitted line;

computing a distance between each of the at least one adjacent point of the final point and the second fitted line, and a distance between each of the at least one adjacent point of the second recorded point and the second fitted line; and determining the point which is farthest from the fitted line, from the at least one adjacent point of the final point and the at least one adjacent point of the second recorded point, according to the computed distances, wherein the determined point is the second determined point;

locating a second line by connecting the final point and the second determined point;

locating a third line by connecting the first determined point and the second determined point;

computing a first angle formed by the first line and the third line, computing a second angle formed by the second line and the third line, computing a first distance between the first determined point and the second line, and computing a second distance between the second determined point and the first line; and determining that the workpiece is qualified upon condition that both the first angle and the second angles are within a first predetermined range, and both the first distance and the second distance are within a second predetermined range; or determining that the workpiece is not qualified upon condition that at least one of the first angle and the second angles is not within the first predetermined range, or at least one of the first distance and the second distance is not within the second predetermined range; and outputting and displaying a determination result on a display device.

2. The method as described in claim 1, wherein the point cloud is arranged based on scanning on the point cloud.

3. A non-transitory computer readable storage medium having stored thereon instructions that, when executed by at least one processor of a computing device, cause the computing device to perform a method for verifying manufacturing accuracy of a workpiece, the method comprising:

reading a point cloud of the workpiece from a storage unit and arranging the point cloud to generate a point sequence;

selecting the first point from the point sequence, determining a first determined point by:

selecting a subsequent point following a current selected point one by one from the point sequence, until a vector formed by the current selected point and the subsequent point exceeds a first predetermined value;

recording the subsequent point as a first recorded point upon condition that the vector exceeds the first predetermined value;

selecting at least one adjacent point of the first point and selecting at least one adjacent point of the first recorded point from the point sequence;

fitting a line using the at least one adjacent point of the first point and the at least one adjacent point of the first recorded point to generate a first fitted line;

computing a distance between each of the at least one adjacent point of the first point and the first fitted line and a distance between each of the at least one adjacent point of the first recorded point and the first fitted line; and determining the point which is farthest from the first fitted line, from the at least one adjacent point of the first point and the at least one adjacent point of the first recorded point, according to the computed distances, wherein the determined point is the first determined point;

locating a first line by connecting the first point and the first determined point;

selecting the final point from the point sequence, determining a second determined point by:

selecting a previous point of a current selected point one by one from the point sequence until a vector formed by the current selected point and the previous point exceeds a second predetermined value;

recording the previous point as a second recorded point upon condition that the vector exceeds the second predetermined value;

selecting at least one adjacent point of the final point, and selecting at least one adjacent point of the second recorded point from the point sequence;

fitting a line using the at least one adjacent point of the final point and the at least one adjacent point of the second recorded point to generate a second fitted line;

computing a distance between each of the at least one adjacent point of the final point and the second fitted line, and a distance between each of the at least one adjacent point of the second recorded point and the second fitted line; and determining the point which is farthest from the fitted line, from the at least one adjacent point of the final point and the at least one adjacent point of the second recorded point, according to the computed distances, wherein the determined point is the second determined point;

locating a second line by connecting the final point and the second determined point;

locating a third line by connecting the first determined point and the second determined point;

computing a first angle formed by the first line and the third line, computing a second angle formed by the second line and the third line, computing a first distance between the first determined point and the second line, and computing a second distance between the second determined point and the first line; and determining that the workpiece is qualified upon condition that both the first angle and the second angles are within a first predetermined range, and both the first distance and the second distance are within a second predetermined range; or determining that the workpiece is not qualified upon condition that at least one of the first angle and the second angles is not within the first predetermined range, or at least one of the first distance and the second distance is not within the second predetermined range.

4. The non-transitory computer readable storage medium as described in claim 3, wherein the point cloud is arranged based on scanning on the point cloud.

5. The non-transitory computer readable storage medium as described in claim 3, further comprising:

outputting a determination result of whether the workpiece is qualified; and displaying the determination result on a display screen.

6. The non-transitory storage medium as described in claim 3, wherein the point cloud is created by a scanner, and is stored in the storage unit.

7. A system for verifying manufacturing accuracy of a workpiece, the system comprising:

a read module operable to read a point cloud of the workpiece, and arrange the point cloud to generate a point sequence;

a determined point determination module operable to select the first point and the final point from the point sequence, determine a first determined point and a second determined point, locate a first line by connecting the first point and the first determined point, locate a second line by connecting the final point and the second determined point, and locate a third line by connecting the first determined point and the second determined point, wherein the first determined point is determined by:

selecting a subsequent point following a current selected point one by one from the point sequence until a vector formed by the current selected point and the subsequent point exceeds a first predetermined value;

recording the subsequent point as a first recorded point upon condition that the vector exceeds the first predetermined value;

selecting at least one adjacent point of the first point, and selecting at least one adjacent point of the first recorded point from the point sequence;

fitting a line using the at least one adjacent point of the first point and the at least one adjacent point of the first recorded point to generate a first fitted line;

computing a distance between each of the at least one adjacent point of the first point and the first fitted line and a distance between each of the at least one adjacent point of the first recorded point and the first fitted line; and determining the point which is farthest from the first fitted line, from the at least one adjacent point of the first point and the at least one adjacent point of the first recorded point, according to the computed distances, wherein the determined point is the first determined point; and the second determined point is determined by:

selecting a previous point of a current selected point one by one from the point sequence until a vector formed by the current selected point and the previous point exceeds a second predetermined value;

recording the previous point as a second recorded point upon condition that the vector exceeds the second predetermined value;

selecting at least one adjacent point of the final point, and selecting at least one adjacent point of the second recorded point from the point sequence;

fitting a line using the at least one adjacent point of the final point and the at least one adjacent point of the second recorded point to generate a second fitted line;

computing a distance between each of the at least one adjacent point of the final point and the second fitted line, and a distance between each of the at least one adjacent point of the second recorded point and the second fitted line; and determining the point which is farthest from the second fitted line, from the at least one adjacent point of the final point and the at least one adjacent point of the second recorded point, according to the computed distances, wherein the determined point is the second determined point;

a computation module operable to compute a first angle formed by the first line and the third line, compute a second angle formed by the second line and the third line, compute a first distance between the first determined point and the second line, and compute a second distance between the second determined point and the first line;

a measurement module operable to determine whether the workpiece is qualified according to the first angle, the second angle, the first distance, and the second distance; and a processor that executes the read module, the determination module, the computation module, and the measurement module.

8. The system as described in claim 7, wherein the point cloud is arranged based on scanning on the point cloud.

9. The system as described in claim 7, wherein the measurement module determines that the workpiece is qualified upon condition that both the first angle and the second angles are within a first predetermined range and both the first distance and the second distance are within a second predetermined range, and determines that the workpiece is not qualified upon condition that at least one of the first angle and the second angles is not within the first predetermined range, or at least one of the first distance and the second distance is not within the second predetermined range.

10. The system as described in claim 7, further comprising an output module operable to output a determination result of whether the workpiece is qualified, and display the determination result on a display device.

11. The system as described in claim 7, wherein the point cloud is created by a scanner, and is stored in a storage unit.

* * * * *

UNITED STATES PATENT AND TRADEMARK OFFICE
CERTIFICATE OF CORRECTION

PATENT NO. : 8,437,981 B2
APPLICATION NO. : 12/824245
DATED : May 7, 2013
INVENTOR(S) : Chang et al.

Page 1 of 1

It is certified that error appears in the above-identified patent and that said Letters Patent is hereby corrected as shown below:

On the title page, item (30) regarding "Foreign Application Priority Data" replace with the following:

(30)    Foreign Application Priority Data

January 29, 2010  (CN) ................................2010 1 0300931

Signed and Sealed this
Fifteenth Day of October, 2013

Teresa Stanek Rea
*Deputy Director of the United States Patent and Trademark Office*